United States Patent [19]

McKiel, Jr.

[11] Patent Number: 5,513,311

[45] Date of Patent: Apr. 30, 1996

[54] METHOD AND SYSTEM FOR CREATING LOGICAL CONNECTIONS IN A DATA PROCESSING SYSTEM

[75] Inventor: Frank A. McKiel, Jr., Trophy Club, Tex.

[73] Assignee: International Business Machines Corporation, Armonk, N.Y.

[21] Appl. No.: 251,533

[22] Filed: May 31, 1994

[51] Int. Cl.$^6$ .................................................. G06F 15/21
[52] U.S. Cl. ........................................................ 395/161
[58] Field of Search .................................. 395/140, 155, 395/161, 159, 160; 364/709.01, 715.01

[56] References Cited

U.S. PATENT DOCUMENTS 5,187,788   2/1993   Marmelstein .......................... 395/700

OTHER PUBLICATIONS

W. S. James and W. K. Johnson, "Dynamic IconNavigation to Nested Containers", Sep. 2, 1993, pp. 386–388.
Richard Goering, Electronic Engineering Times, "Logic Synthesis Links With Layout", Apr. 5, 1993 p. 37.
Electronc News, "Mentor Graphics", May 24, 1993, p. 10.

*Primary Examiner*—Phu K. Nguyen
*Attorney, Agent, or Firm*—David A. Mims, Jr.; Duke W. Yee; Andrew J. Dillon

[57] ABSTRACT

A method and system for efficiently creating connections between a new graphic object and at least one of a plurality of existing graphic objects displayed within a graphic editor. In response to a placement of a new graphic object in a location within the graphic editor, each existing graphic object within the plurality of graphic objects located within a predetermined distance from the new graphic object is identified. A connection is automatically created between the new object and each identified existing graphic object. A position for each identified existing graphic object is determined, wherein the position for each identified existing graphic object is determined with respect to the location of the new graphic object. A logical function between the new graphic object and a identified existing graphic object is established in response to a creation of a connection between the new graphic object and the identified existing graphic object, wherein the established logical function is a type of logical function that is determined by the position of the identified existing graphic object with respect to the new graphic object, wherein connections between graphic objects are efficiently created.

15 Claims, 11 Drawing Sheets

= A(B + C + D)EF

500   NODE A
         GROUP LIST      0
         IN LIST         *           *Fig. 5A*
         OUT LIST        B, C, D
         COORDINATE      x, y

502   NODE B
         GROUP LIST      B, C, D
         IN LIST         A           *Fig. 5B*
         OUT LIST        E
         COORDINATE      x, y

504   NODE C
         GROUP LIST      B
         IN LIST         0           *Fig. 5C*
         OUT LIST        0
         COORDINATE      x, y

506   NODE D
         GROUP LIST      B
         IN LIST         0           *Fig. 5D*
         OUT LIST        0
         COORDINATE      x, y

508   NODE E
         GROUP LIST      0
         IN LIST         B, C, D     *Fig. 5E*
         OUT LIST        F
         COORDINATE      x, y

510   NODE F
         GROUP LIST      0
         IN LIST         E           *Fig. 5F*
         OUT LIST        *
         COORDINATE      x, y

* LIST MAY CONTAIN PRE-EXISTING
  EXPLICIT CONNECTIONS

METHOD AND SYSTEM FOR CREATING LOGICAL CONNECTIONS IN A DATA PROCESSING SYSTEM

BACKGROUND OF THE INVENTION

1. Technical Field:

The present invention relates generally to an improved data processing system and more particularly to an improved method and system for data manipulation. Still more particularly, the present invention provides an improved method and system for automatically creating logical connections between objects.

2. Description of the Related Art:

The manipulation of data in a data processing system is well known in the prior art. Data may be manipulated in many ways in a modern state-of-the-art data processing system including: data accessing, data encoding, data communications, data compression, data conversion, data entry, data exchange, data filing, data linking, data locking, data manipulation, data mapping, data modeling, data processing, data recording, data sorting, and data transferring. The large amounts of data that are available to the user of a modern state-of-the-art data processing system often become overwhelming in magnitude and complexity.

A graphic user interface (GUI) is often employed to manage and manipulate data. Often times, the manipulation of data involves logical operations. In a GUI, the manipulation of data may be accomplished via graphical objects having logical relationships between them to form a logical expression. The presently known methods and systems for creating logical relationships between graphical objects require a visible connection between the graphical objects. A logical editor is a type of graphical object editor that is typically employed in a GUI to create or compose logical expressions with graphic objects. Iconic representation of logical elements, also referred to as "nodes", may be placed on a work space within the logical editor by the user and connected by manipulating a mouse or keyboard input so that a desired logical function can be expressed by the user and performed by the data processing system. Existing logical editors require explicit connection of elements to allow interaction between the elements. These explicit connections are typically in the form of a line with an arrow at one end of the line to indicate the logic flow. These explicit connections require space in the work space of the logical editor. As the number of graphical objects increase, the work space in which the graphical objects are displayed becomes crowded and cluttered.

Therefore, it would be advantageous to have an improved method and system for creating logical relationships between graphical objects to provide for efficient use of the work space.

SUMMARY OF THE INVENTION

It is therefore one object of the present invention to provide an improved data processing system.

It is another object of the present invention to provide an improved method and system for data manipulation.

It is yet another object of the present invention to provide an improved method and system for automatically creating logical connections between objects.

The foregoing objects are achieved as is now described. The present invention provides a method and system for efficiently creating connections between a new graphic object and at least one of a plurality of existing graphic objects displayed within a graphic editor. In response to a placement of a new graphic object in a location within the graphic editor, each existing graphic object within the plurality of graphic objects located within a predetermined distance from the new graphic object is identified. A connection is automatically created between the new object and each identified existing graphic object. A position for each identified existing graphic object is determined with respect to the location of the new graphic object. A logical function between the new graphic object and a identified existing graphic object is established in response to a creation of a connection between the new graphic object and the identified existing graphic object, wherein the established logical function is a type that is determined by the position of the identified existing graphic object with respect to the new graphic object, wherein connections between graphic objects are efficiently created.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIGS. 5A–5F depict diagrams of data structures for the nodes depicted in FIG. 4;

DETAILED DESCRIPTION OF PREFERRED EMBODIMENT

Figure 1:
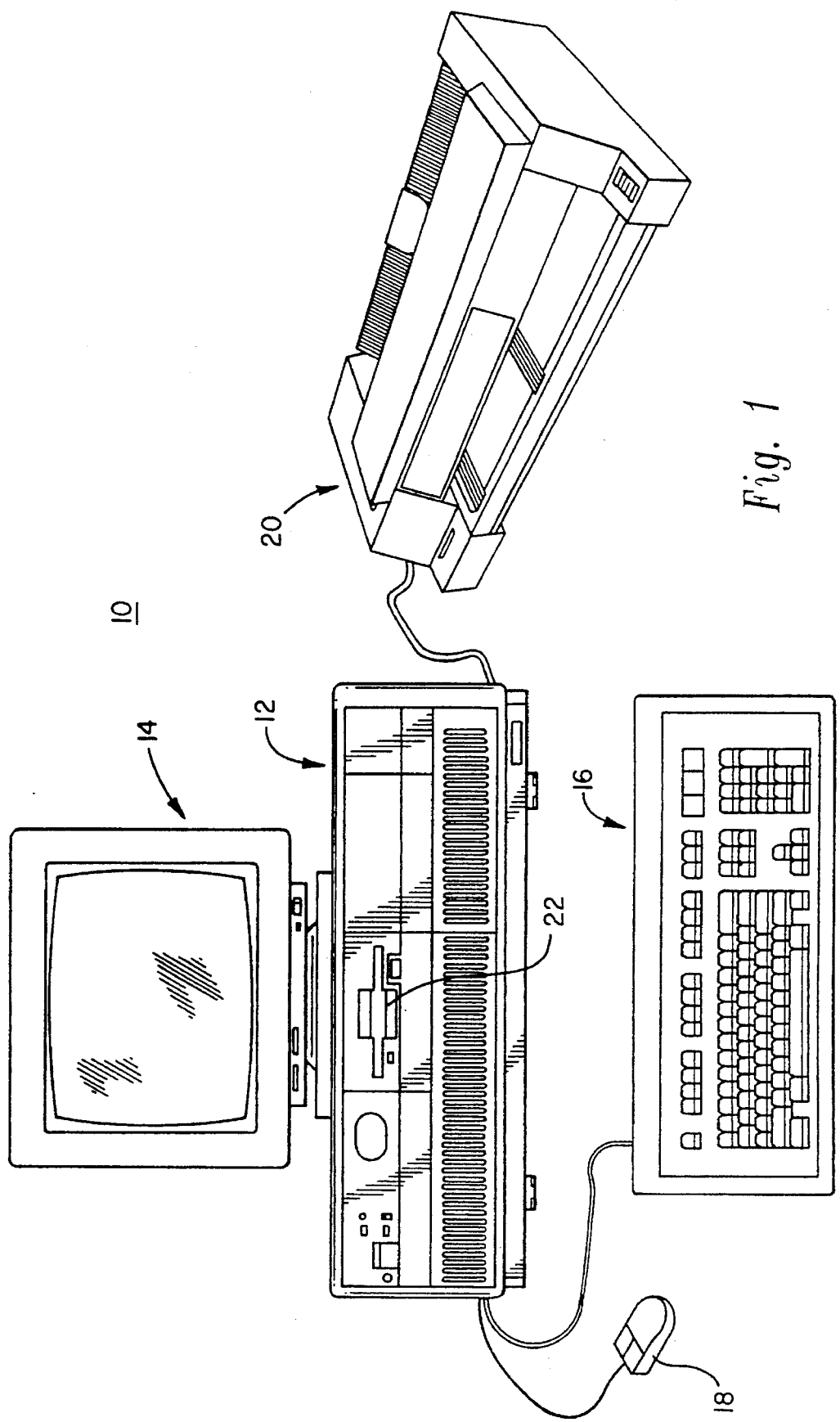
FIG. 1 depicts a data processing system in the form of a personal computer in which the present invention can be employed is depicted.

Referring now to the figures, and in particular to FIG. 1, a data processing system, personal computer system 10, in which the present invention can be employed is depicted. As shown, personal computer system 10 comprises a number of components, which are interconnected together. More particularly, a system unit 12 is coupled to and can drive an optional monitor 14 (such as a conventional video display). A system unit 12 also can be optionally coupled to input devices such as a PC keyboard 16 or a mouse 18. Mouse 18 includes right and left buttons (not shown). The left button is generally employed as the main selector button and alternatively is referred to as the first mouse button or mouse button 1. The right button is typically employed to select auxiliary functions as explained later. The right mouse button is alternatively referred to as the second mouse button or mouse button 2. An optional output device, such as a printer 20, also can be connected to the system unit 12. Finally, system unit 12 may include one or more mass storage devices such as the diskette drive 22.

As will be described below, the system unit 12 responds to input devices, such as PC keyboard 16, the mouse 18, or local area networking interfaces. Additionally, input/output (I/O) devices, such as floppy diskette drive 22, display 14, printer 20, and local area network communication system are connected to system unit 12 in a manner well known. Of course, those skilled in the art are aware that other conventional components also can be connected to the system unit 12 for interaction therewith. In accordance with the present invention, personal computer system 10 includes a system processor that is interconnected to a random access memory (RAM), a read only memory (ROM), and a plurality of I/O devices.

In normal use, personal computer system 10 can be designed to give independent computing power to a small group of users as a server or a single user and is inexpensively priced for purchase by individuals or small businesses. In operation, the system processor functions under an operating system, such as IBM's OS/2 operating system or DOS. OS/2 is a registered trademark of International Business Machines Corporation. This type of operating system includes a Basic Input/Output System (BIOS) interface between the I/O devices and the operating system. BIOS, which can be stored in a ROM on a motherboard or planar, includes diagnostic routines which are contained in a power on self test section referred to as POST.

Figure 2:
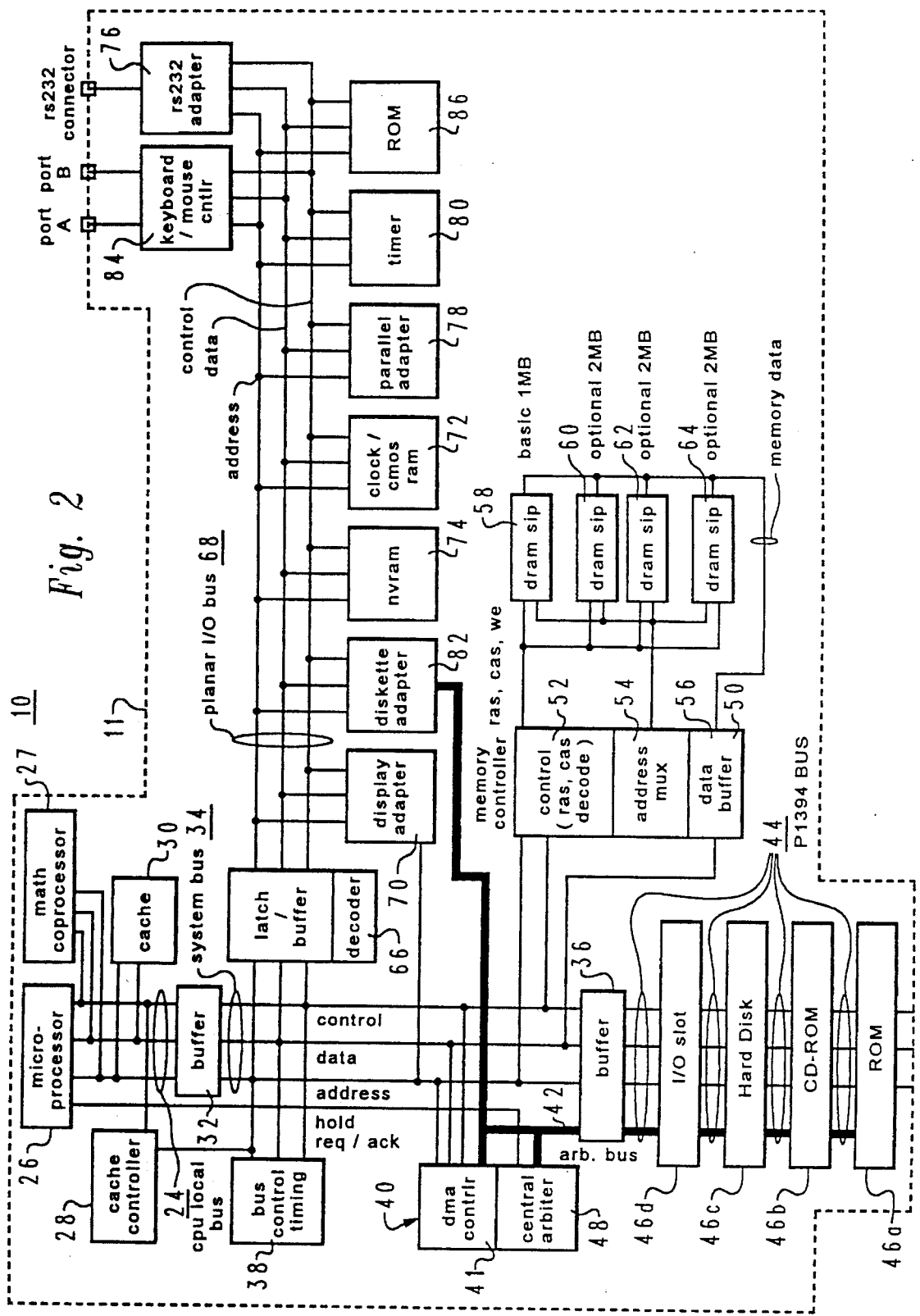
FIG. 2 is a block diagram of a personal computer system illustrating the various components of personal computer system in accordance with the present invention.

Prior to relating the above structure to the present invention, a summary of the operation in general of personal computer system 10 may merit review. Referring to FIG. 2, there is shown a block diagram of personal computer system 10 illustrating the various components of personal computer system 10 in accordance with the present invention. FIG. 2 further illustrates components of planar 11 and the connection of planar 11 to I/O slots 46a–46d and other hardware of personal computer system 10. Connected to planar 11 is the system central processing unit (CPU) 26 comprised of a microprocessor which is connected by a high speed CPU local bus 24 through a bus controlled timing unit 38 to a memory control unit 50 which is further connected to a volatile random access memory (RAM) 58. While any appropriate microprocessor can be used for CPU 26, one suitable microprocessor is the Pentium microprocessor, which is sold by Intel Corporation. "Pentium" is a trademark of Intel Corporation.

While the present invention is described hereinafter with particular reference to the system block diagram of FIG. 2, it is to be understood at the outset of the description which follows, it is contemplated that the apparatus and methods in accordance with the present invention may be used with other hardware configurations of the planar board. For example, the system processor could be an Intel 80286, 80386, or 80486 microprocessor. These particular microprocessors can operate in a real addressing mode or a protected addressing mode. Each mode provides an addressing scheme for accessing different areas of the microprocessor's memory.

Returning now to FIG. 2, CPU local bus 24 (comprising data, address and control components) provides for the connection of CPU 26, an optional math coprocessor 27, a cache controller 28, and a cache memory 30. Also coupled on CPU local bus 24 is a buffer 32. Buffer 32 is itself connected to a slower speed (compared to the CPU local bus) system bus 34, also comprising address, data and control components. System bus 34 extends between buffer 32 and a further buffer 36. System bus 34 is further connected to a bus control and timing unit 38 and a Direct Memory Access (DMA) unit 40. DMA unit 40 is comprised of a central arbitration unit 48 and a DMA controller 41. Buffer 36 provides an interface between the system bus 34 and an optional feature bus such as the Micro Channel bus 44. "Micro Channel" is a registered trademark of International Business Machines Corporation. Connected to bus 44 are a plurality of I/O slots 46a–46d for receiving Micro Channel adapter cards which may be further connected to an I/O device or memory. In the depicted example, I/O slot 46a has a hard disk drive connected to it; I/O slot 46b has a CD-ROM drive connected to it; and I/O slot 46c has a ROM on an adapter card connected to it. An arbitration control bus 42 couples the DMA controller 41 and central arbitration unit 48 to I/O slots 46 and diskette adapter 82. Also connected to system bus 34 is a memory control unit 50 which is comprised of a memory controller 52, an address multiplexer 54, and a data buffer 56. Memory control unit 50 is further connected to a random access memory as represented by RAM module 58. Memory controller 52 includes the logic for mapping addresses to and from CPU 26 to particular areas of RAM 58. While the personal computer system 10 is shown with a basic 1 megabyte RAM module, it is understood that additional memory can be interconnected as represented in FIG. 2 by the optional memory modules 60 through 64.

A further buffer 66 is coupled between system bus 34 and a planar I/O bus 68. Planar I/O bus 68 includes address, data, and control components respectively. Coupled along planar bus 68 are a variety of I/O adapters and other peripheral components such as display adapter 70 (which is used to drive an optional display 14), a clock 72, nonvolatile RAM 74 (hereinafter referred to as "NVRAM"), a RS232 adapter 76, a parallel adapter 78, a plurality of timers 80, a diskette adapter 82, a PC keyboard/mouse controller 84, and a read only memory (ROM) 86. The ROM 86 includes BIOS which provides the user transparent communications between many I/O devices.

Clock 72 is used for time of day calculations. NVRAM 74 is used to store system configuration data. That is, the NVRAM will contain values which describe the present configuration of the system. For example, NVRAM 74 contains information which describe the capacity of a fixed disk or diskette, the type of display, the amount of memory, etc. Of particular importance, NVRAM 74 will contain data which is used to describe the system console configuration; i.e., whether a PC keyboard is connected to the keyboard/mouse controller 84, a display controller is available or the ASCII terminal is connected to RS232 adapter 76. Furthermore, these data are stored in NVRAM 74 whenever a special configuration program is executed. The purpose of the configuration program is to store values characterizing the configuration of this system to NVRAM 76 which are saved when power is removed from the system.

Connected to keyboard/mouse controller 84 are ports A and B. These ports are used to connect a PC keyboard (as opposed to an ASCII terminal) and mouse to the PC system. Coupled to RS232 adapter unit 76 is an RS232 connector.

An optional ASCII terminal can be coupled to the system through this connector.

Specifically, personal computer system 10 may be implemented utilizing any suitable computer such as the IBM PS/2 computer or an IBM RISC SYSTEM/6000 computer, both products of International Business Machines Corporation, located in Armonk, N.Y. "RISC SYSTEM/6000" is a trademark of International Business Machines Corporation and "PS/2" is a registered trademark of International Business Machines Corporation.

Figure 3:
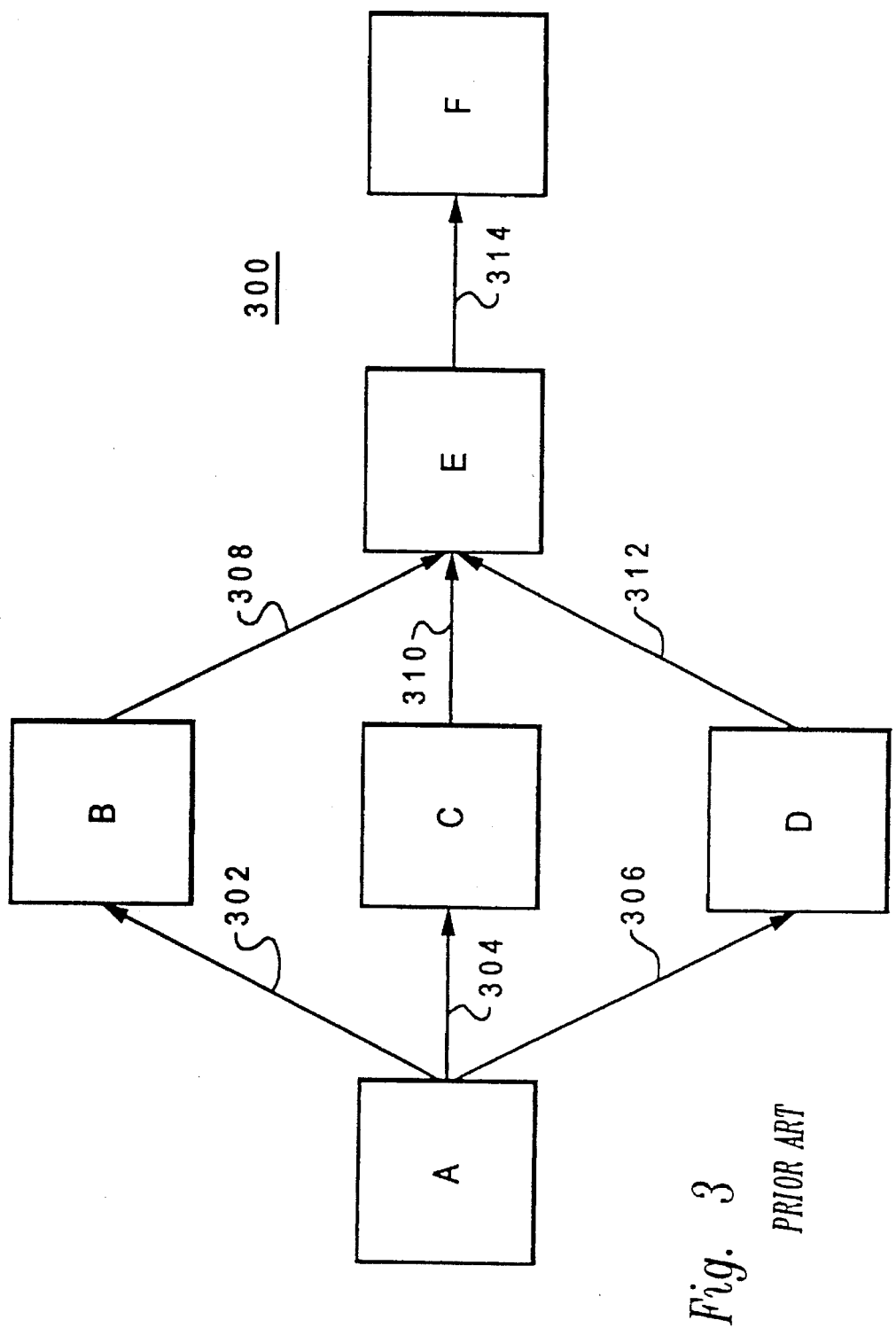
FIG. 3 depicts graphical objects having logical relationships via visible connectors known in the art.

Referring next to FIG. 3, a block diagram of a known logical editor containing graphical objects having visible connections to form logical relationships between nodes to create a logical expression is depicted. Work space 300 includes nodes A–F. These nodes are depicted on the work space as graphical objects in the form of blocks. These nodes form the following logical operation: A(B+C+D)EF. In creating this logical operation, a user selects the various logical block, such as nodes A–F. The user places the nodes within work space 300 and draws logical connections 302–314. As can be seen, existing logical editors require visible connection of elements, referred to as "nodes" in the depicted example.

Figure 4:
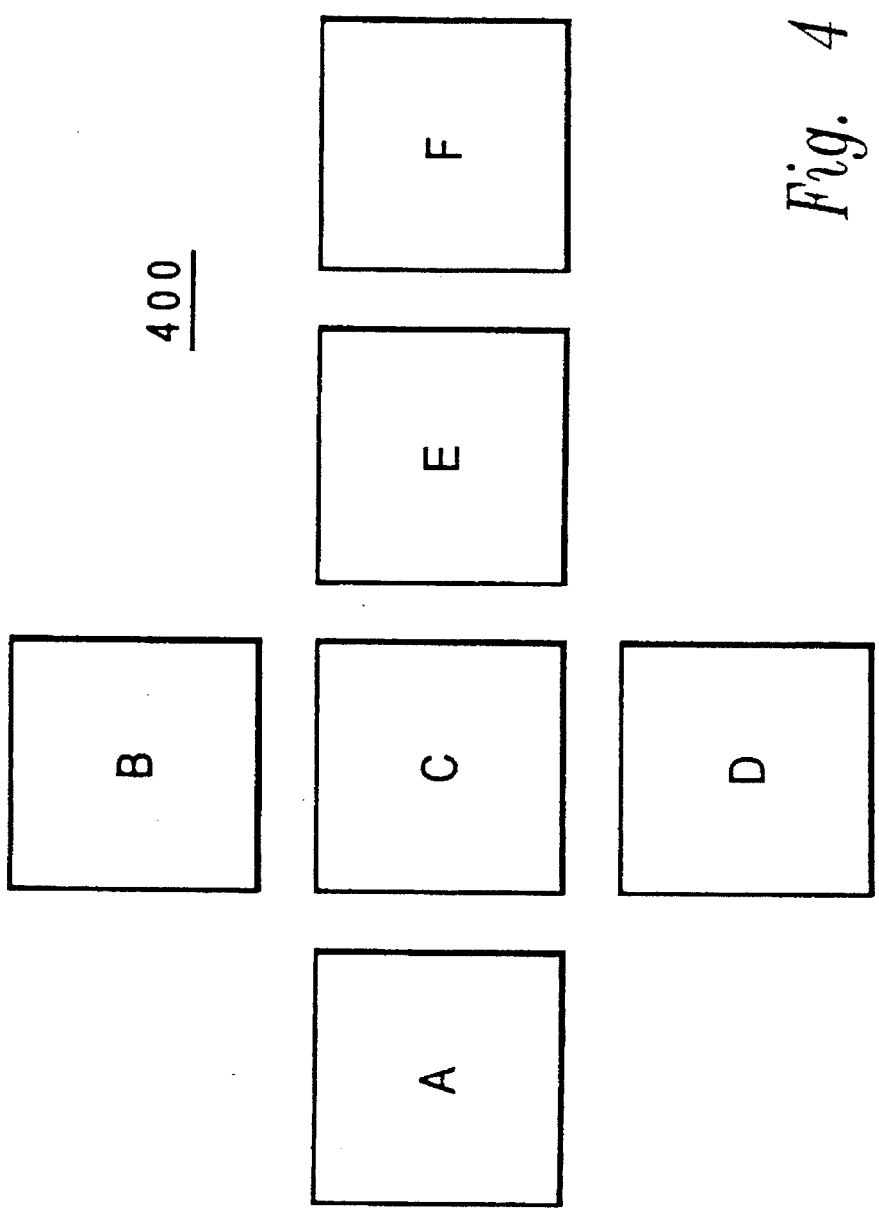
FIG. 4 is a block diagram of graphical objects using logical connections to form a logical expression in accordance with a preferred embodiment of the present invention.

Referring now to FIG. 4, a block diagram of a logical editor containing graphical objects employed in a logical expression is depicted in accordance with the preferred embodiment of the present invention. Nodes A–F on work space 400 form the logical expression: A(B+C+D)EF. This logical expression is identical to the one depicted in FIG. 3 and can be expressed as A AND (B OR C OR D) AND E AND F. Absent, however, are explicit connections between the logical elements. In accordance with the preferred embodiment of the present invention, the relative positions of the nodes on work space 400 determine logical connections, which are the functional relationships between the nodes. The logic states, representing either an activity or actual data, flow in a particular direction across work space 400. For example, the flow is from left to right in work space 400 in accordance with a preferred embodiment of the present invention.

In the depicted example, node A is evaluated first. Thereafter, a logic state is passed from node A to nodes B, C and D. These blocks are evaluated and a logic state may be passed from one of these nodes to node E and then from node E to node F. The placement of nodes aligned in a substantially horizontal configuration produces a logical connection in the form of an AND function between the nodes without the user having to explicitly draw or see graphical connections between the nodes. Nodes placed in a vertical relationship with each other, such as nodes B–D form logical connections in the form of an OR function. The vertical positioning of elements causes multiple actions to be triggered simultaneously or in parallel.

Although the depicted example employs a horizontal relationship for a AND function and a vertical relationship for an OR function and is processed from left to right, other flows or orientations may be employed in accordance with a preferred embodiment of the present invention. Also, logical functions other than AND and OR may be employed. Additionally, the present invention may be employed with a three dimensional representation of the logical elements. This would allow an additional logical function or logical construct to be employed. In other words, a logical construct, such as ELSE, may be added in addition to the AND and the OR functions depicted in the present example if a three dimensional display of logical elements is employed.

Referring now to FIGS. 5A–5F, diagrams of data structures 500–510 for the nodes depicted in FIG. 4 are illustrated in accordance with a preferred embodiment of the present invention. Each data structure is associated with a node using a unique identifier in accordance with a preferred embodiment of the present invention. The data structure includes a Group List, an In List, and an Out List. The Group List is employed to hold data on OR conditions. The In List of a given element lists other nodes that send data to that element. The Out List of a given element in the data structure lists nodes that receive data from that element. Data structures 500–510 also include X, Y coordinates of the node on the work space. The X,Y coordinates serve as an input to a graphical parser to process the nodes. All other data in the data structure is initialized for output by the parser and subsequent use in further processing, such as actually carrying out the desired logical function that is created. The "*" in FIGS. 5A and 5F means that the list may contain pre-existing explicit connections.

Although not described, explicit or visible connections may be created by the user in addition to parser-derived implicit or logical connections in accordance with a preferred embodiment of the present invention. The graphical objects depicting the elements, also called "nodes", are icons that are assumed to be roughly square and uniform in dimensions in accordance with a preferred embodiment of the present invention. The actual appearance of an icon, however, does not have to conform to its allotted space in accordance with a preferred embodiment of the present invention.

Figure 6A:
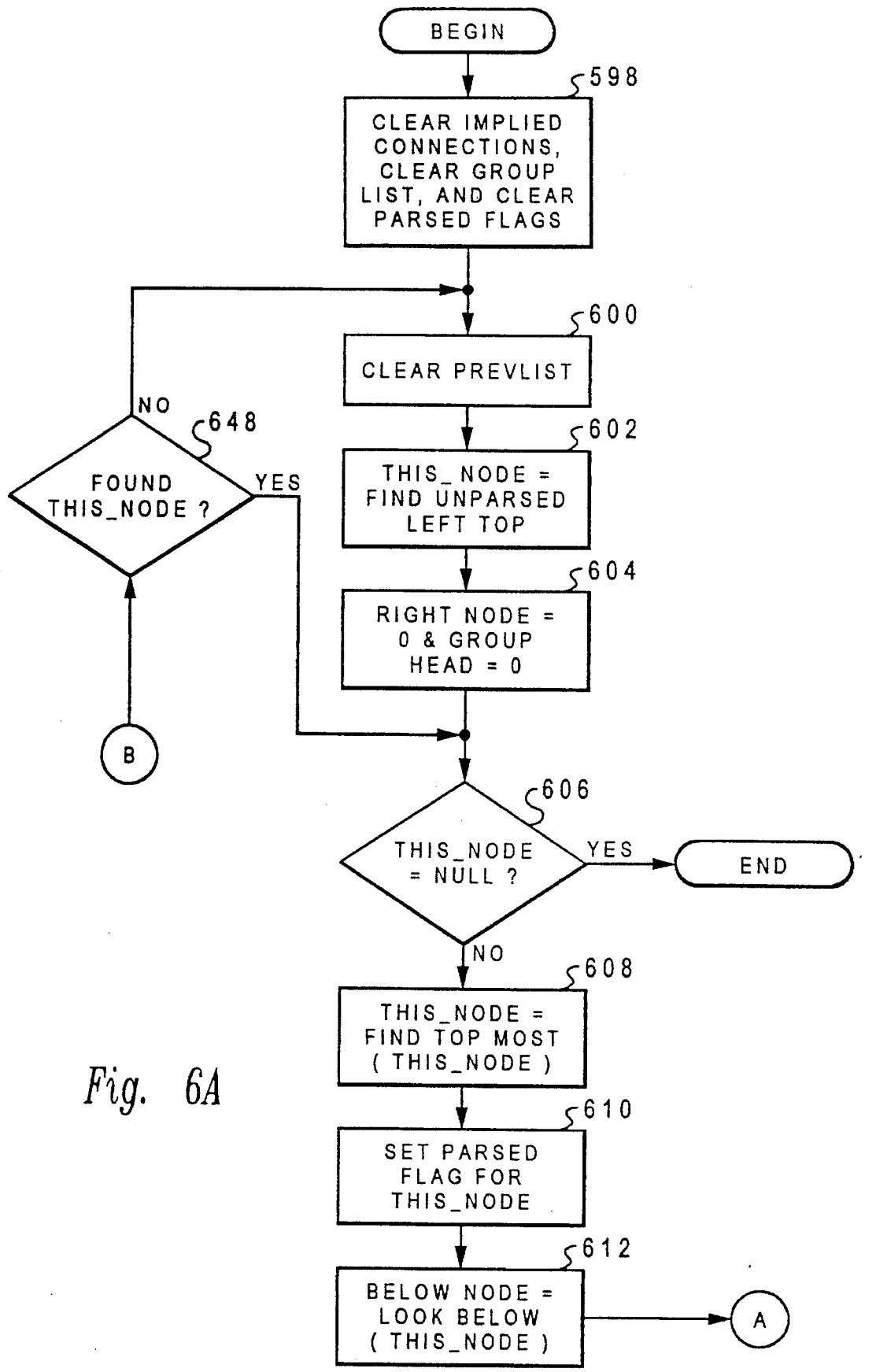
FIGS. 6A–6C are flowcharts of a process employed by parser to create logical connection in accordance with a preferred embodiment of the present invention.
Figure 6B:
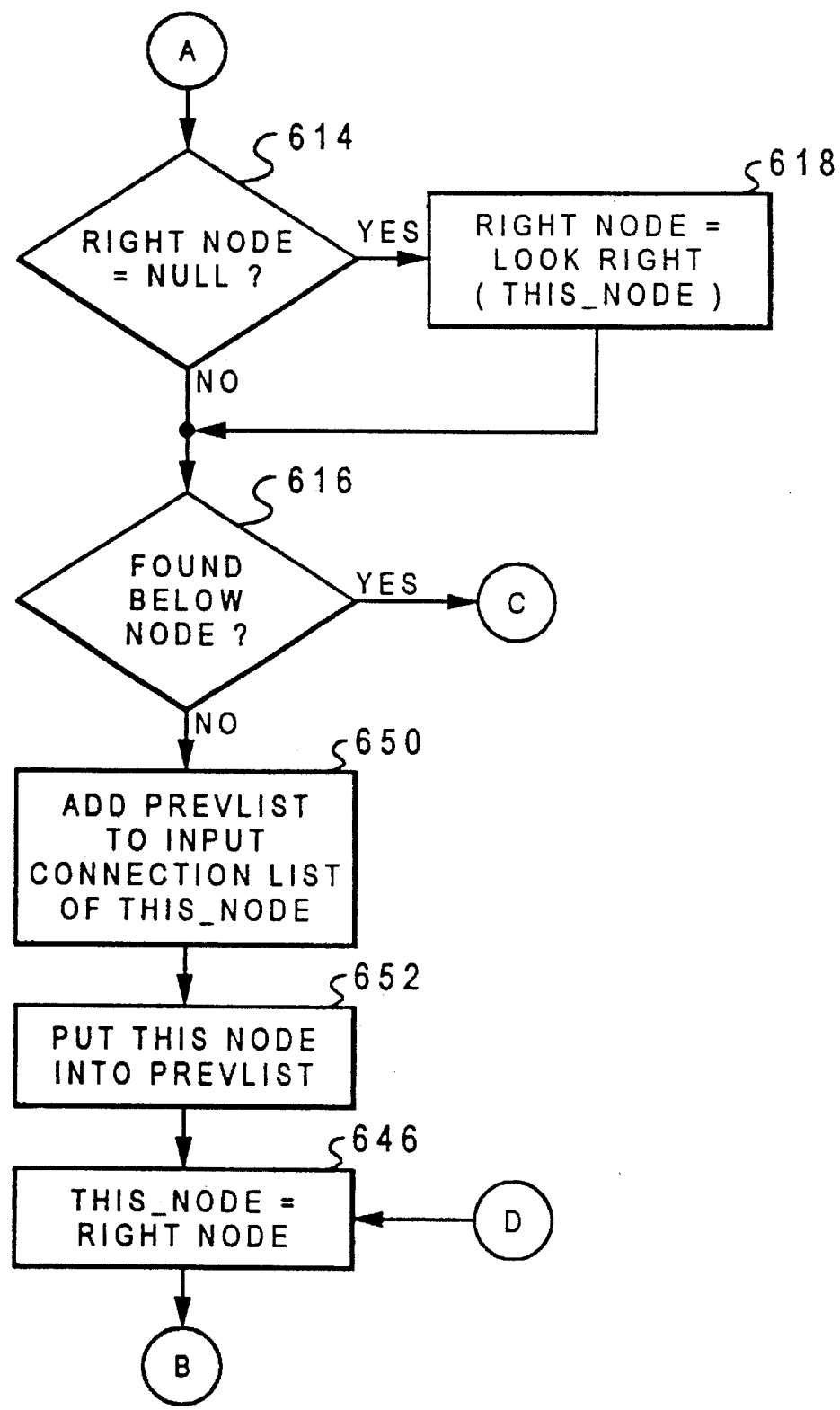
Figure 6C:
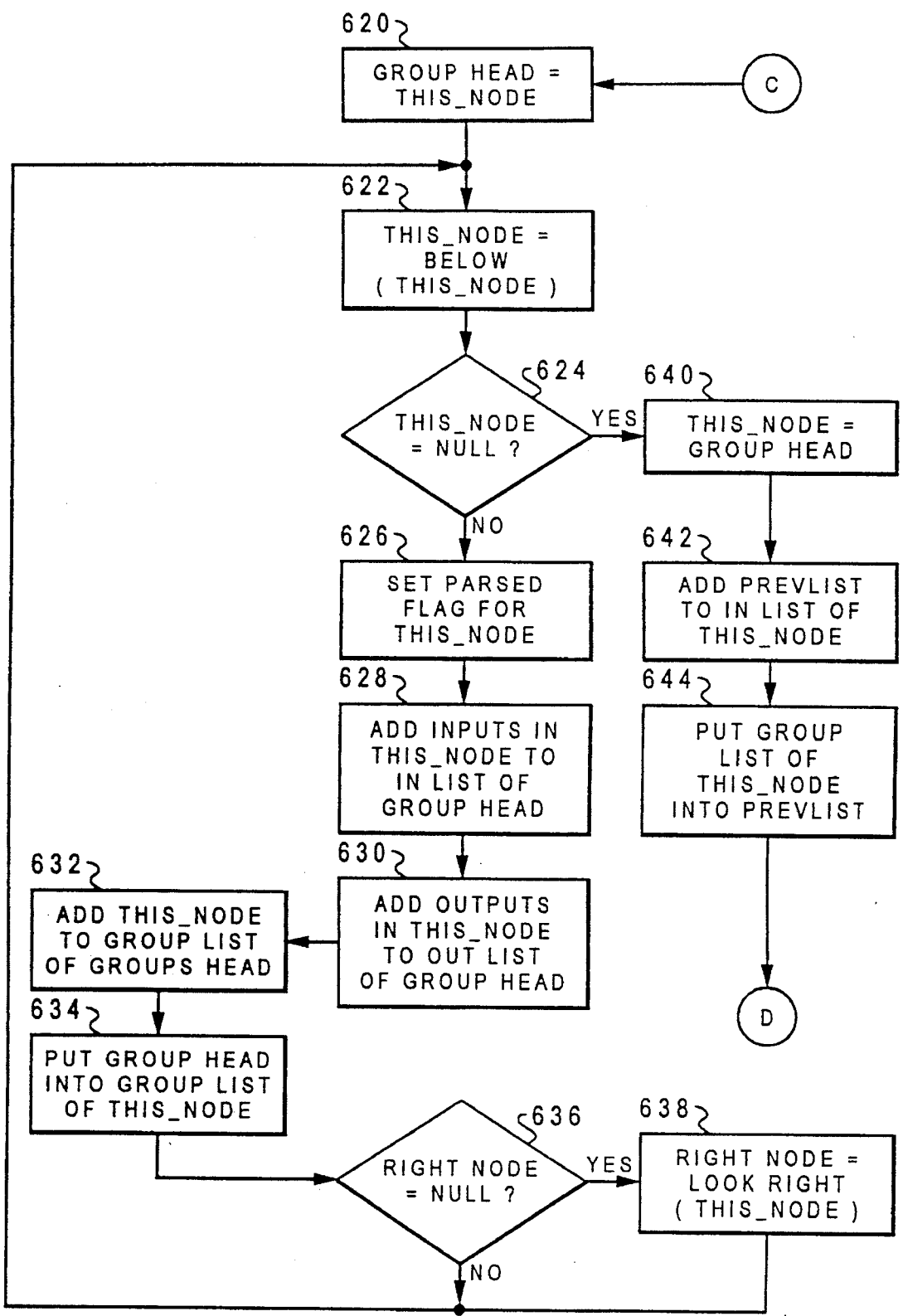

Referring now to FIGS. 6A–6C, a flowchart of a process employed by a parser to create logical connections is illustrated in accordance with a preferred embodiment of the present invention. In the depicted example, the parser is employed to examine the layout of elements on a work surface whether a "snap-grid" or "free-form", and decide how the layout should be interpreted to create an AND/OR logical expression. This process may be invoked in different situations, such as when a new node is added, existing nodes are rearranged, or in response to a command from a user. The process begins by clearing the implied connections from the connection lists in all nodes, clearing the group list, and clearing the parsed flag, as illustrated in block 598. In clearing implied connections from the connection lists, the explicit connections are not cleared. The process then clears PREVLIST, as depicted in block 600. "PREVLIST" is a list of previous connections that is used by the process in creating logical expressions from the nodes. PREVLIST is used to address carry over from processing from one column to the next.

Thereafter, THISNODE is set equal to the result of the FindUnparsedLeftTop procedure as illustrated in block 602. The process sets Right Node=0 and Group Head=0, as shown in block 604. The process then determines whether THISNODE is equal to null, as depicted in block 606. If THISNODE is not equal to null, the process then sets THIS NODE equal to the result of Find Top Most (THIS NODE) procedure, as depicted in block 608. Next, the parsed flag is set for THISNODE, as illustrated in block 610. The process then sets the Below Node equal to the result of Look Below (THISNODE) procedure, as depicted in block 612. The process then determines whether Right Node is equal to null, as illustrated in block 614. If the answer is no, the process then proceeds to determine whether Below Node has been found, as depicted in block 616. On the other hand, if the answer to the determination of block 614 is yes, the process then sets Right Node equal to the result of the Look Right (THISNODE) procedure, as depicted in block 618. Then, the process determines whether Below Node has been found, as depicted in block 614. The Right Node variable is used to determine if more nodes are to be processed in the next column.

If Below Node is found, the process then sets Group Head equal to THISNODE, as illustrated in block 620. Next, the process sets THIS-NODE equal to the result of the Look Below (THISNODE) procedure, as depicted in block 622. Next, the process determines whether THISNODE is equal to null, as illustrated in block 624. If THISNODE is not null, the process then sets the parsed flag for THISNODE, as depicted in block 626. Thereafter, the inputs in THIS NODE are added to the In List of the Group Head, as illustrated in block 628. The process then adds outputs in THISNODE to the Out List of the Group Head, as depicted in block 630. THISNODE is added the Group List of the Group Head as illustrated in block 632. The process then places the Group Head into the Group List of THIS NODE, as depicted in block 634.

Then, a determination is made as to whether the Right Node is null, as illustrated in block 636. If the Right Node is null, the process sets Right Node equal to the result of the Look Right (THISNODE) procedure, as depicted in block 638. The process then returns to block 622. Referring again to block 636, if the Right Node is not equal to null, the process also returns to block 622.

Referring back to block 624, if THISNODE is equal to null, the process then sets THISNODE equal to Group Head, as illustrated in block 640. Thereafter, the process adds the PREVLIST In List to THISNODE, as depicted in block 642. The Group List on THISNODE is then put into PREVLIST, as illustrated in block 644. Thereafter, the process sets THIS NODE equal to Right Node, as depicted in block 646. This step basically moves the examination of the elements over to the next column in the work space. Thereafter, the process determines whether THISNODE has been found, as illustrated in block 648. If THISNODE has not been found the process returns to block 600. If THISNODE is found the process then returns to block 606.

Referring again to block 616, if Below Node is not found, the process then adds PREVLIST to the input connection list of THISNODE, as illustrated in block 650. The process then puts THISNODE into PREVLIST, as depicted in block 653. Thereafter, the process continues as previously described with respect to block 646.

Figure 7:
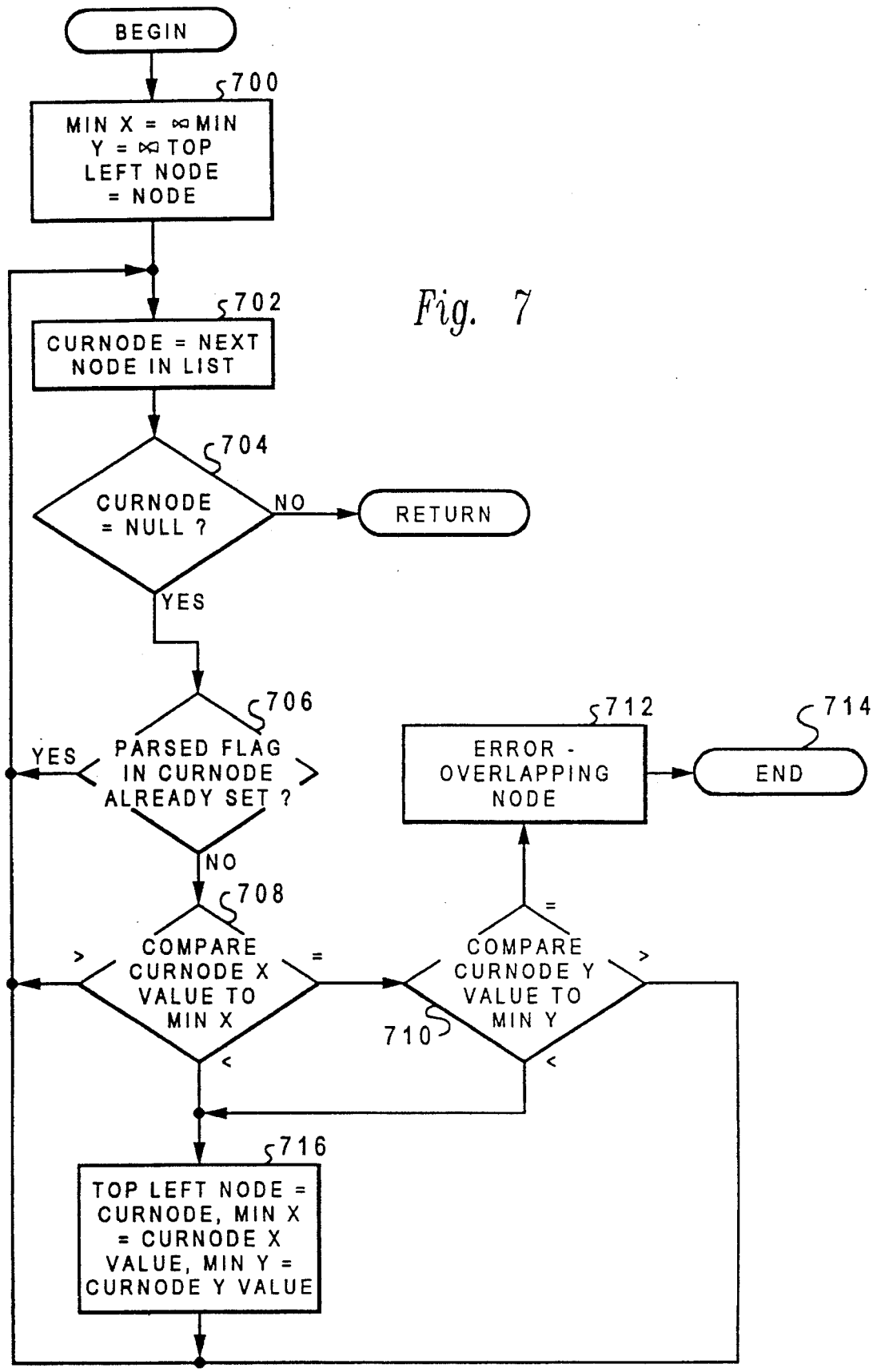
FIG. 7 is a flowchart of a process for locating an unparsed top left node in accordance with a preferred embodiment of the present invention.

Referring now to FIG. 7, a flowchart of a process for finding an unparsed left-most top-most node is depicted in accordance with a preferred embodiment of the present invention. This process is implemented in a fourth quadrant system where X,Y coordinates (0,0) represent the upper left hand corner. This process is a more detailed description of block 604 in FIG. 6. The process begins by setting MINX equal to infinity, MIN Y equal to infinity, and Top Left Node equal to null, as illustrated in block 700. Thereafter, the process sets the Current Node, CURNODE, equal to the next node in the list, as depicted in block 702. Next, a determination of whether CURNODE is equal to null is made, as illustrated in block 704. If the CURNODE is equal to null, the process then determines whether parsed flags are already set in the CURNODE, as depicted in block 706. If parsed flags are not already set, the process then compares the CURNODE X value to MIN X, as illustrated in block 708. If the CURNODE X value is equal to MIN X, the process then compares the CURNODE Y value to MIN Y, as depicted in block 710.

If the CURNODE Y value is equal to MIN Y, the process then sends an error message stating that overlapping nodes exist, as illustrated in block 712. Thereafter, the process exits the program, as depicted in block 714. Referring again to block 710, if the CURNODE Y value is less than MIN Y the process then proceeds to set Top Left Node equal to the CURNODE, set MINX equal to the CURNODE X, and set MIN Y equal to the CURNODE Y value, as illustrated in block 716. Thereafter, the process returns to block 702. Referring again to block 710, if the CURNODE Y value is greater than the MIN Y, the process also returns to block 702. Referring again to block 708, if the X value of CURNODE is less than MIN X, the process proceeds to block 714 as described above. A determination that the CURNODE X value is greater than MIN X in block 708 results in the process returning to block 702. Referring again to block 706, if a parsed flag is set for CURNODE, the process also returns to block 702. Referring now to block 704, if the CURNODE is not equal to null, the process is finished and returns for processing, as depicted in FIG. 6.

Figure 8:
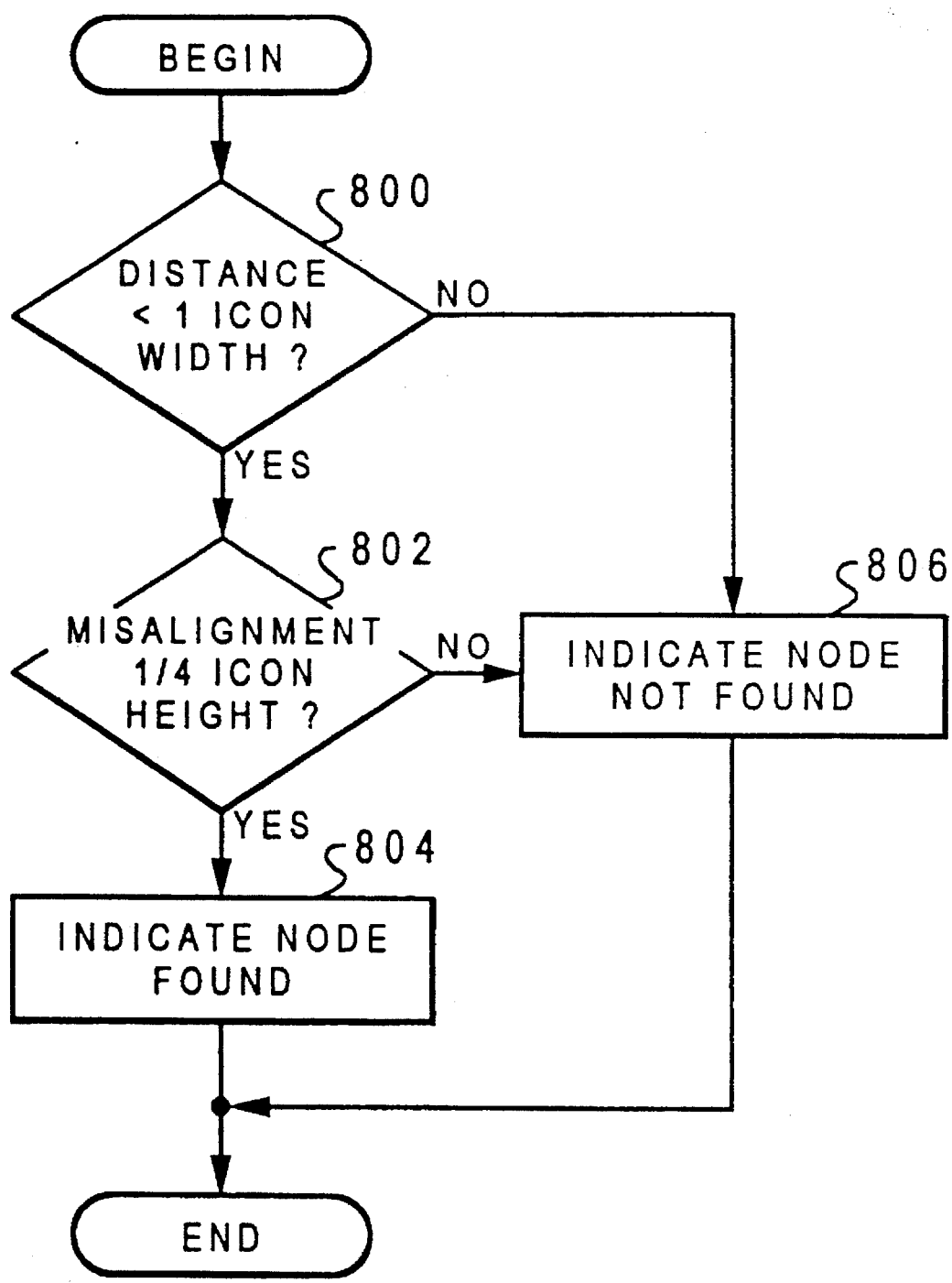
FIG. 8 is a flowchart of a process for determining whether a connection should be made.

Referring now to FIG. 8, a flowchart of a process for determining whether two nodes are in the proper distance and orientation for creating a logical connection is depicted in accordance with a preferred embodiment of the present invention. In the depicted examples, the nodes are icons that are assumed to be roughly square and uniform in dimension although the actually appearance of the icon does not have to conform with its allotted space on the work space. In graphical adjacency search functions, such as LookRight (THISNODE), LookBelow (THISNODE), FindTopMost, the following flowchart chart is employed to determine whether two nodes meets the criteria for creating a connection. FindTopMost involves LookUp (THISNODE), which is repeated until the top most node is found.

The process begins by determining whether the distance in the direction being searched is less than one icon width, as illustrated in block 800. If the distance is less than one icon with, the process then determines whether the misalignment lateral to the search directions is less than one fourth of an icon height, as depicted in block 802. If misalignment is less than one fourth of an icon height, the process then indicates that an adjacent node is found, as illustrated in block 804. When an adjacent node is found, a connection may be made between the two nodes. Referring back to blocks 800 and 802 if the answer is no to either of these determinations the process then indicates that an adjacent node has not been found, as depicted in block 806. In the situation in which an adjacent node is not found, a connection is not created.

Figure 9A:
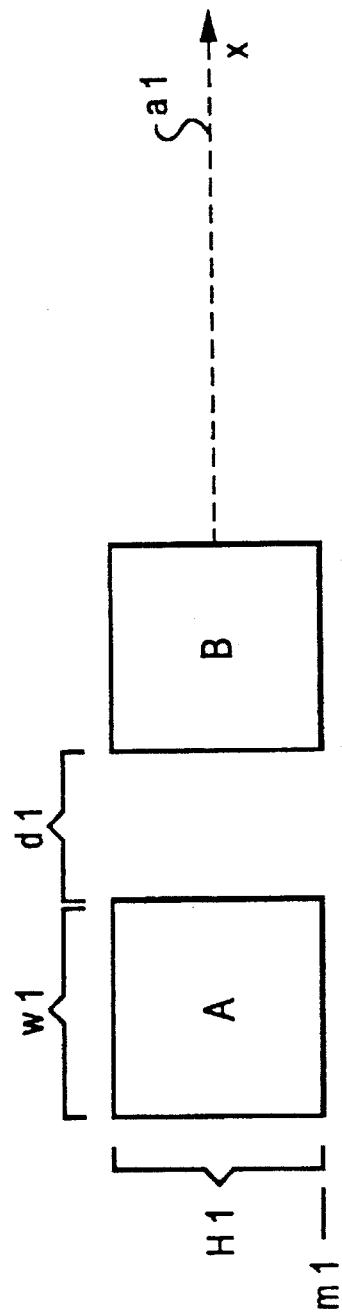
FIGS. 9A–9B are illustrations of nodes demonstrating distances and misalignment.
Figure 9B:
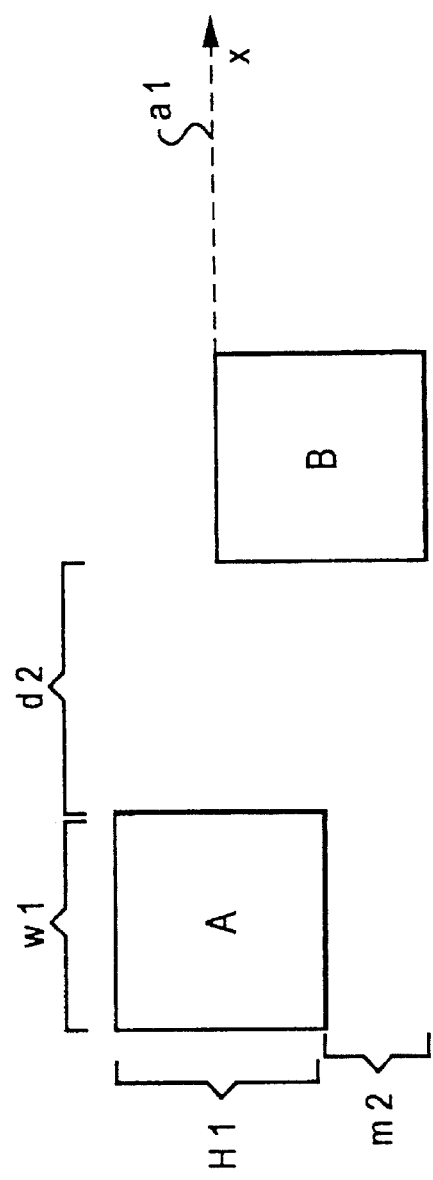

FIGS. 9A and 9B are illustrations of nodes demonstrating distances and misalignment in accordance with a preferred embodiment of the present invention. If a Look Right function is being performed from node A, the search direction in FIG. 8A is along the X axis in the direction indicated by arrow a1 the on axis distance d1 is less than one icon width, which is indicated by width w1. The extent of misalignment m1 lateral to the search direction is less than one fourth of icon height h1. In this case the misalignment m1 is 0. Thus, a Look Right (THISNODE) function would determine that a node, node B has been found and create the appropriate connection between the two nodes.

In FIG. 9B, the application of the Look Right () function in this example would not result in a node being found. The direction being searched is in the X axis direction as indicated by arrow a1. The distance between node A and node B, distance d2, is greater than the width w1. Furthermore, the extent of misalignment m2 lateral to the search direction is greater than one fourth of icon height h1, thus, in this case no connection would be created between node A and node B. Although the depicted examples in FIGS. 9A and 9B are directed towards a search direction along the X axis, the search directions could be change to be along the Y axis in a similar fashion.

The processes depicted in FIGS. 6–8 may be implemented by those of ordinary skill in the art within the data processing system depicted in FIGS. 1 and 2. The processes of the present invention also may be implemented in a program storage device that is readable by a data processing system, wherein the program storage device encodes data processing system executable instructions coding for the processes of the present invention. The program storage device may take various forms including, for example, but not limited to a hard disk drive, a floppy disk, an optical disk, a ROM, and an EPROM, which are known to those skilled in the art. The processes stored on a program storage device are dormant until activated by using the program storage device with the data processing system. For example, a hard drive containing data processing system executable instructions for the present invention may be connected to a data processing system; a floppy disk containing data processing system executable instructions for the present invention may be inserted into a floppy disk drive in the data processing system; or a ROM containing data processing system executable instructions for the present invention may be connected to the data processing system via a card or adapter connected to an I/O slot.

An advantage of the graphical logical editing provided by the present invention is that the density of functional expression in a work space is increased. Another advantage of the present invention is that the number of steps required to create a function is decreased.

While the invention has been particularly shown and described with reference to a preferred embodiment, it will be understood by those skilled in the art that various changes in form and detail may be made therein without departing from the spirit and scope of the invention.

What is claimed is:

1. A method in a data processing system for efficiently creating a logical connection between a new graphic object and at least one of a plurality of existing graphic objects, wherein a number of diverse types of logical connections may be created between graphic objects, said method comprising:

in response to a placement of a new graphic object in a location, identifying each existing graphic object within said plurality of existing graphic objects located within a predetermined distance from said new graphic object; and automatically creating a particular logical connection between said new graphic object and each identified existing graphic object based upon a position of each identified existing graphic object with respect to said new graphic object, wherein logical connections between graphic objects are efficiently created.

2. The method of claim 1, wherein said new object and said plurality of objects are located in a display having a x-axis and a y-axis and wherein said step of automatically creating a particular logical connection includes creating an AND connection in response to said new graphic object and an identified existing graphic object being located along a line parallel to an x-axis.

3. The method of claim 1, wherein said new object and said plurality of objects are located in a display having a x-axis and a y-axis and wherein said step of automatically creating a particular logical connection includes creating an OR connection in response to said new graphic object and an identified existing graphic object being located along a line parallel to a y-axis.

4. The method of claim 1 further comprising ascertaining a logical expression utilizing said new object and said plurality of objects having a logical connection with said new object.

5. A method in a data processing system for efficiently creating connections between a new graphic object and at least one of a plurality of existing graphic objects displayed within a graphic editor, said method comprising:

in response to a placement of a new graphic object in a location within said graphic editor, identifying each existing graphic object within said plurality of graphic objects located within a predetermined distance from said new graphic object;

automatically creating a connection between said new object and each identified existing graphic object;

determining a position for each identified existing graphic object, wherein said position for each identified existing graphic object is determined with respect to said location of said new graphic object; and automatically establishing a logical function between said new graphic object and a identified existing graphic object in response to a creation of a connection between said new graphic object and said identified existing graphic object, wherein said established logical function is a type of logical function that is determined by said position of said identified existing graphic object with respect to said new graphic object, wherein connections between graphic objects are efficiently created.

6. A data processing system for efficiently creating a logical connection between a new graphic object and at least one of a plurality of existing graphic objects, wherein a number diverse types of logical connections may be created between graphic objects, said data processing system comprising:

identification means, responsive to a placement of a new graphic object in a location, for identifying each existing graphic object within said plurality of existing graphic objects located within a predetermined distance from said new graphic object; and creation means for automatically creating a particular logical connection between said new graphic object and each identified existing graphic object based upon a position of each identified existing graphic object with respect to said new graphic object, wherein logical connections between graphic objects are efficiently created.

7. The data processing system of claim 6, wherein said new object and said plurality of objects are located in a display having a x-axis and a y-axis and wherein said creation means includes means for creating an AND connection in response to said new graphic object and an identified existing graphic object being located along a line parallel to an x-axis.

8. The data processing system of claim 7, wherein said new object and said plurality of objects are located in a display having a x-axis and a y-axis and wherein said creation means includes means for creating an OR connection in response to said new graphic object and an identified existing graphic object being located along a line parallel to a y-axis.

9. The data processing system of claim 8 further means for ascertaining a logical expression utilizing said new object and said plurality of existing objects having a logical connection with said new object.

10. The data processing system of claim 9, wherein said means for ascertaining includes evaluating said new object and said plurality of existing objects having a logical connection with said new object from a left to right direction on said display.

11. The data processing system of claim 6, wherein said new object and said plurality of existing graphic objects have the same shape and size.

12. A program storage device readable by a data processing system, said program storage device encoding data processing system executable instructions for efficiently creating a logical connection between a new graphic object and at least one of a plurality of existing graphic objects in said data processing system, wherein a number diverse types of logical connections may be created between graphic objects, said program storage device comprising:

first instruction means, responsive to a placement of a new graphic object in a location, for identifying each existing graphic object within said plurality of existing graphic objects located within a predetermined distance from said new graphic object; and second instruction means for automatically creating a particular logical connection between said new graphic object and each identified existing graphic object based upon a position of each identified existing graphic object with respect to said new graphic object, wherein logical connections between graphic objects are efficiently created.

13. A method in a data processing system for efficiently creating a logical connection between a new graphic object and at least one of a plurality of existing graphic objects, wherein a number of diverse types of logical connections may be created between graphic objects, said method comprising:

in response to a placement of a new graphic object in a location, identifying each existing graphic object within said plurality of existing graphic objects located within a predetermined distance from said new graphic object; and automatically creating a particular logical connection between said new graphic object and each identified existing graphic object based upon a position of each identified existing graphic object with respect to said new graphic object without creating a visible connection between said new graphic object and each identified existing graphic object, wherein logical connections between graphic objects are efficiently created.

14. The method of claim 13, wherein said new object and said plurality of objects are located in a display having a x-axis and a y-axis and wherein said step of automatically creating a particular logical connection includes creating an AND connection in response to said new graphic object and an identified existing graphic object being located along a line parallel to an x-axis.

15. The method of claim 13, wherein said new object and said plurality of objects are located in a display having a x-axis and a y-axis and wherein said step of automatically creating a particular logical connection includes creating an OR connection in response to said new graphic object and an identified existing graphic object being located along a line parallel to a y-axis.

* * * * *